(12) United States Patent
Gilmour et al.

(10) Patent No.: US 6,534,449 B1
(45) Date of Patent: Mar. 18, 2003

(54) REMOVAL OF WELLBORE RESIDUES

(75) Inventors: Alan Gilmour, Houston, TX (US); Ralph Cheung, Spring, TX (US); Alexander Bui, Katy, TX (US)

(73) Assignee: Schlumberger Technology Corp., Sugar Land, TX (US)

( * ) Notice: Subject to any disclaimer, the term of this patent is extended or adjusted under 35 U.S.C. 154(b) by 0 days.

(21) Appl. No.: 09/579,072

(22) Filed: May 25, 2000

Related U.S. Application Data

(60) Provisional application No. 60/136,171, filed on May 27, 1999.

(51) Int. Cl.$^7$ ............................. C09K 3/00; E21B 21/00
(52) U.S. Cl. ...................... 507/203; 507/263; 507/219; 507/254; 507/261; 507/927; 507/929; 166/311; 166/312
(58) Field of Search ............................. 507/203, 219, 507/263, 254, 261, 927, 929; 166/311, 312

(56) References Cited

U.S. PATENT DOCUMENTS 4,154,301 A * 5/1979 Carlin et al. ................ 507/263
4,775,489 A    10/1988 Watkins et al.
5,723,423 A *  3/1998 Van Slyke ................... 507/203
5,773,390 A *  6/1998 Salisbury .................... 507/203

FOREIGN PATENT DOCUMENTS

GB    2 301 854 A    6/1996

* cited by examiner

*Primary Examiner*—Philip Tucker
(74) *Attorney, Agent, or Firm*—Robin Nava; Thomas Mitchell; Catherine Menes

(57) ABSTRACT

A wellbore fluid composition effective to reduce oil-containing residue and water wet wellbore surfaces is provided. The fluid composition comprises a terpene composition and a surfactant. Methods for use of the fluid composition as a single spacer or as a multiple spacer in conjunction with a second fluid are provided. Methods for use of the composition in reduction or removal of oil-containing residue from wellbore surfaces, as a clean-up fluid, in wellbore completions, as a displacement fluid, and in wellbore treatment are provided.

59 Claims, No Drawings

REMOVAL OF WELLBORE RESIDUES

This application claims the benefit of U.S. Provisional Application No. 60/136,171, filed May 27, 1999.

FIELD OF THE INVENTION

The invention relates to treatment of surfaces in wellbores, and further concerns compositions and methods for improving surfaces in wellbores for further operations. The invention particularly concerns the provision of surfaces in wellbores adapted for improved bonding with cement.

BACKGROUND OF THE INVENTION

The use of oil based or synthetic fluids or muds is common in drilling and in other wellbore operations, for a variety of reasons. The oil based or synthetic fluids generally comprise invert emulsion fluids, where the continuous or external phase is predominantly organic or hydrocarbonaceous in nature and the inverse or internal phase is aqueous. For example, an oil based fluid or drilling mud may comprise one or more mineral and/or synthetic oils containing from 5 to 50 percent by volume of water, based on the total volume of fluid, the water being dispersed as very small droplets, usually less than a micron in diameter in the continuous oil phase. The stability of the invert emulsion is generally maintained by one or more additives present in the fluid, such as emulsifiers, emulsion stabilizing agents, and oil wetting agents.

While oil based fluids provide desired advantages or utility in particular circumstances, and, in some instances, will be the fluid(s) of choice, their advantages must be balanced in the situation against certain disadvantages accompanying their use. For example, use of such fluid(s) can pose difficulties in cementing procedures, or in operations designed for reworking a well. In the case of cementing, for example, a significant difficulty encountered is that the oil based fluid "oil wets" or coats wellbore surfaces, as well as casing and pipe run into the wellbore. For simplicity, as used hereinafter, the expressions "wellbore surface" or "wellbore surfaces" may be understood to encompass not only formation surface or surfaces extant in the drilled opening or wellbore, but may be taken to include formation surface(s) near the wellbore, such as designed fractures or cavities where gravel packing or other operations may be undertaken, along with the surfaces of equipment, e.g., casing, screens, pipe, etc, as may be present in the wellbore or in the formation near the wellbore.

The "oil wetting" of the formation surfaces by the oil based or synthetic fluids produces an oily residue or oily "cake" which renders the surfaces unsuited for many wellbore operations. For example, because cements utilized in wellbore cementing are formulated with aqueous liquid(s), initiation of cementing operations without removal of or otherwise mitigating the oil wet surfaces may result in poor cement bonding, thus defeating the purpose of the cementing operation. This problem is compounded by the fact that the formation surfaces may be porous and quite different from the non-porous metallic casing or equipment surfaces. Similar difficulties arise in gravel packing operations.

Again, in so-called open-hole reservoirs, production is initiated through the formation wall and screens directly. In such instances, any oil based fluid(s) cake that is not removed before or promptly after initiation of production may impair inflow through either the screens or the formation wall. Maximization of production and reduction of completion hardware damage requires, therefore, that measures be undertaken to reduce or remove the cake.

In the past, oily cake or oily residue has been removed in some cases by using a wash, perhaps from the same oil as the mud, which contained appropriate solvents and a mixture of surfactants. Another approach has employed a water-free mixture of surfactants and an alcohol. In some instances, various solvents, such as xylene, toluene, and low flash point terpenes, have been used. For a variety of reasons, including cost and increasing safety and environmental concerns, one or more of these options may be unattractive in a given case. In other instances, oil based fluid residue removal has not been sufficiently achieved, and, for example, cement bonding with a formation has not been satisfactory. As utilized hereinafter, the expression "oil-containing residue" is taken to include the oily "cake" on the formation surfaces and/or the oily residue left or remaining on equipment, casing, gravel, etc., in or in the formation near the wellbore. The invention addresses the problem of oil-containing residue on wellbore surfaces.

SUMMARY OF THE INVENTION

Accordingly, in one embodiment, the invention relates to a novel method or process comprising contacting a wellbore surface with an amount of wellbore fluid composition comprising a terpene composition and wetting surfactant, in an amount sufficient or effective to reduce oil-containing residue from the wellbore surface and water wet wellbore surface. The combination fluid composition supplied in effective amount thus comprises sufficient or effective amount of terpene composition to dissolve oil from the wellbore surface to a desired degree, and an amount of wetting surfactant effective to water wet wellbore surface. As employed herein, "water wet" indicates conditioning of wellbore surface to the extent that water adheres to at least a significant portion of the wellbore surface, as contrasted with oil wet or oil-containing surface which is significantly hydrophobic.

According to the invention, the terpene composition is selected from cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof. Commonly available terpenes and terpenoids, many of which are alcohols, may be used, and are generally available in varying degrees of purity, generally available as mixtures. The preferred terpenes are biodegradable monoterpenes, such as d-limonene and alpha-pinene derivatives. In the preferred fluid composition, the terpene composition will be present in an amount of at least 85 percent by weight, more preferably at least 90 percent, and most preferably up to about 99 percent by weight of the blend. Unless otherwise specified or evident from the context, all percentages given herein are by weight, based on the weight of the fluid. The fluid composition may contain, if desired, minor quantities of components such as solvents, etc.

The wetting surfactant will be selected on the basis of capability to achieve the water wet condition mentioned, and the term "surfactant", as utilized herein, is understood to include mixtures of appropriate surface active materials. In general, the wetting surfactant may be selected from anionic, which includes soaps (e.g., sodium stearate) whose active groups are anions; cationic, such as quaternary ammonium compounds; non-ionic, such as alcohol ethoxylates; and Zwitterionic, such as sulfobetaine. Commonly, the concentration in the fluid of the surfactant will range from 0.01 percent to 5 percent, possibly to 10 or 12 percent, preferably 0.1 percent to about 4 percent. The capability of a surfactant to water wet surfaces, such as wellbore surfaces, may be determined by testing, as described herein.

In a preferred aspect, to insure that water wetting of a wellbore surface is achieved to the desired extent, e.g., in the possibility that the surfactant has not water wet the wellbore surface under the wellbore conditions extant, the wellbore surface may further be contacted, after the above-mentioned contacting or treatment, with an aqueous fluid comprising a viscosifying organic polymer and wetting surfactant. This combination will be supplied in an amount sufficient to insure water wetting of the wellbore surface to the extent desired. In this further stage, the aqueous fluid will contain, as indicated, a viscosifying organic polymer (preferably synthetic) which is most preferably a water soluble polymer of an acrylic or methacrylic acid. The surfactant chosen may be the same as that for the first stage or spacer. The combination of the viscosifying polymer and the water wetting surfactant in the aqueous fluid insures effective removal of first stage solution with oil-containing residue and water wets wellbore surfaces. While a wide variety of polymers may be employed, those described in U.S. Pat. No. 4,432,881 to Evani and U.S. Pat. No. 4,429,097 to Chang et al, both patents incorporated herein by reference, are particularly suitable. Generally, the aqueous fluid will contain or comprise from about 0.25 pounds per barrel to about 3.0 pounds per barrel or more of the viscosifying synthetic polymeric material, and from 1 percent to about 12 percent of wetting surfactant. Mixtures of suitable polymers may be employed, and, as indicated, the "surfactant" may comprise mixtures, these components being utilized in any and all proportions. Anionic and non-ionic classes of surfactant are preferred.

In a further embodiment, the invention relates to a composition for treating oil-based residue in or on well-bore surfaces comprising a first fluid composition containing a terpene composition and wetting surfactant, in an amount sufficient or effective to reduce oil-containing residues from wellbore surfaces and water wet wellbore surfaces. Additionally, the invention comprises a system for treating oil-based residue in or on wellbore surfaces including the first fluid composition and a second removal fluid comprising an aqueous fluid containing or comprising a viscosifying synthetic organic polymer and surfactant, in an amount sufficient (effective) to water wet wellbore surface.

The invention further comprises fluid compositions or fluids formed by blending, in any order, the required components, and use of such in the methods of the invention. Thus, suitable wellbore fluid compositions may be formed by blending, in any order, a terpene composition and wetting surfactant, in amounts effective to reduce oil-containing residues from a wellbore surface, and sufficient wetting surfactant may be blended to water wet wellbore surface. If desired, a weighting agent may also blended. Preferably, the terpene composition is blended in an amount of at least 85 percent, more preferably at least 90 percent, and most preferably up to about 95 percent by weight of the wellbore fluid composition.

Similarly, the system for reducing oil-containing residue from a wellbore surface may comprise a first wellbore fluid composition formed by blending, in any order, a terpene composition and wetting surfactant, in amounts effective to reduce oil-containing residues from a wellbore surface; and a second removal fluid comprising an aqueous fluid formed by blending a viscosifying organic polymer and wetting surfactant in an amount sufficient to water wet wellbore surface. A weighting agent may also blended with the first wellbore fluid composition and/or the second removal fluid, and the terpene composition may be blended in an amount of at least 85 percent, more preferably at least 90 percent, and most preferably up to about 95 percent by weight of the wellbore fluid composition. The systems so blended may be used in the methods described herein as appropriate.

In the normal case, an effective amount of the first composition may be pumped in the well and contacts the wellbore surface for a time sufficient to reduce oil-based residue. A suitable time may be from about 5 to 20minutes of contact time, although greater or lesser times may be used. Similar times may be used for the second or water wetting stage or spacer. Other embodiments will become apparent from the following detailed description.

DETAILED DESCRIPTION OF THE INVENTION

The invention lends itself to various approaches, including use of weighted and unweighted embodiments or fluids. In an unweighted version, the method employed may involve a single fluid or spacer, or may comprise two or multiple spacers. For example, the first or single stage fluids composition could contain 85 to 99% of d-limonene and/or other terpene composition, and 1 to 12 or even 15% anionic or non-ionic surfactant, and 0–4% of water. If more than one spacer is used, the second stage spacer or subsequent spacers may comprise aqueous based solutions containing 4–10% surfactant. In a weighted version, the first or single spacer fluid composition may contain 85–99% by wt of d-limonene or similar terpene composition, a surfactant in the range of 1 to 12%, water in the range of 0 to 4%; a viscosifier, e.g., an organophilic clay in the range of 1.0 to 8.0 ppb or, for example, a cross-linked aluminum phosphate ester in the range of 0.25% to 3.0%; and a weighting agent, e.g., barite, to provide a fluid with a density range from 8.5–22 ppg. If employed, the secondary spacer or subsequent spacers of the invention are aqueous based, and contain a synthetic polymeric viscosifier, the surfactant in the concentrations mentioned, and a weighting agent to provide a fluid with a density range from 8.5–22 ppg. Fluid loss additives may also be added to this spacer. Optionally, prior to the aqueous based fluid, a sweep fluid or composition, such as brine, may be utilized.

In a further aspect of the invention, in an open-hole reservoir, the chosen completion design requires change to a water based fluid after drilling the well with oil based or synthetic based mud. However, contact between an aqueous fluid and the oil based or synthetic based fluid, which contains surfactant and other potentially emulsifying components, may lead to emulsification. This emulsification may then lead to high viscosity fluids, which may cause hydraulic fracturing of the well. Ideally, the open-hole is displaced to brine with a neutralizing spacer in between. The first and/or spacer treatment of the invention may be employed as an appropriate spacer.

Accordingly, potential uses of the method and system of the invention include a number of clean-up situations in open-hole reservoirs. For example, the invention may be used for clean-up of oil-based mud from the reservoir section of the well, which is to be completed without casing string of cement. The invention may be used to displace oil-based or synthetic based mud to a brine or base-oil in an open-hole reservoir, or to displace oil-based or synthetic based mud to a brine, base-oil, or viscosified completion fluid before or after running a sand control screen downhole. The invention may be employed in displacing oil-based or synthetic based mud to a brine before gravel-packing the well using a water-based gravel-pack carrier fluid. This displacement can either take place with or without screen in the well.

In further aspects, the invention may be used in reducing oil-containing residue that is impairing hydrocarbon production after completing the open-hole reservoir; in reducing or removing oil-containing residue that is impairing hydrocarbon production after gravel-packing the open-hole reservoir either with a water-based or an oil-based gravel pack carrier; and in reducing or removing oil-containing residue from screens that is impairing production.

In some instances, a wellbore fluid composition having a greater flash point will be desired. In such cases, a quantity of a suitable or compatible liquid may be blended to provide a fluid composition having an increased flash point. Suitable liquids may include the oil or synthetic base fluids utilized in formulation of oil-based fluids or synthetic based fluids, as well as other suitable organic fluids, in limited quantities. For example, a higher flash point wellbore composition might contain up to 70 percent of the oil used for the oilbased fluid. Accordingly, where flash point is of concern, a suitable wellbore fluid composition according to the invention may comprise the terpene composition and the surfactant in an amount sufficient to reduce oil-containing residues from wellbore surfaces. Preferably, the fluid composition will comprise about 25% to about 90 percent of the terpene composition, 1 to 5 percent surfactant, and 5 percent to 70 percent of the oil or synthetic base.

According to the invention, a repeatable methodology has been developed to determine mud removal from both metallic and porous media. Experiments indicate that the ability to remove diesel, oil or synthetic fluids varies depending on the base fluid used. Base fluids listed as equivalents also vary widely. Escaid 110 fluids and enhanced mineral oils, are difficult to remove. D-limonene is the most effective solvent. A combination of D-limonene and surfactant in a single spacer is the preferred removal composition of the invention. In many cases, cleaned surfaces are left water wet. Traces of mud left may still be oil wet. This is also true of wall cake. A secondary surfactant spacer may be used to water wet residual mud or cake.

Weighted spacers may behave differently from those which are unweighted. Where barite is used as a weighting agent, coating of barite on the test metal or tile surfaces may occur. This occurred where the surfactant was added to D-limonene or used as a secondary spacer. Therefore a balance has to be found between water wetting capability and barite coating out on surfaces.

EXAMPLES

Anionic surfactant compositions that were water-soluble organic molecules whose hydrophilic group was anionic were investigated. A total of eight different chemical classes of surfactant were investigated:

| | |
|---|---|
| a) Carboxylic Acid Salt: | (i) Ether carboxylate (EC) |
| b) Sulfonic Acid Salt: | (i) Alkyl benzenesulfonate (ABS) |
| | (ii) Alpha olefin sulfonate (AOS) |
| | (iii) Naphthalenesulfonate (NS) |
| c) Sulfuric Acid Ester Salt: | (i) Sulfated linear alcohol (SLA) |
| | (ii) Sulphated polyoxy-ethylenated alcohol (SPA) |
| d) Phosphoric Acid Ester | (i) Phosphated Polyoxy-ethylenated alcohol (PPA) |
| e) Fluorochemical Surfactant | (i) Fluorinated alkyl-alkoxylate (FAA) |

Eight commercially available oil/synthetic base fluids were investigated. The commercially available oil/synthetic base fluids were:
  a) Linear Alpha Olefin (LAO)
  b) Internal Olefin (Biobase 130)—C14:C16
  c) Linear paraffin (Biobase 300)
  d) Paraffin, IPAR 3
  e) Ester, Finagreen
  f) Enhanced Mineral Oils—Escaid 110, HDF 2000, LVT 200, Certrex 67
  g) Diesel In addition, due to the wide range of densities and oil/synthetic:water ratios possible in the field, three separate fluids for each base fluid type were initially tested, 60:40 (10 ppg), 75:25 (12 ppg) and 90:10 (14 ppg). Later work continued with only the 75:25 (12 ppg) fluids.

Surfactant solutions were prepared: 400 ml of 2 wt % aqueous surfactant solution was prepared with deionized water in a 16 oz glass bottle for all the surfactant compositions except fluorinated alkyl alkoxylate, for which a 0.01 wt % aqueous solution was prepared. The surfactant solutions were heated to 1 80° F. in a preheated water bath.

Example 1

Fann 35 Tests

Fann 35 tests were conducted to determine mud removal from a metal surface to initially screen the effectiveness of the surfactants. Exposure time (approximately 10 minutes) and shear applied were selected to be close to downhole conditions. The effects of mud rheology and oil/synthetic water ratio; surfactant concentration; temperature; and surfactant composition were considered.

The oil-based mud was mixed in a 1-gallon plastic mix in a lab shaker for 1 hour, then 450 ml of mud was transferred to an atmospheric consistometer cup and stirred for 20 minutes in a preheated 180° F. atmospheric consistometer. The mud was then transferred to a heated Fann cup preheated at 180° F.

The Fann 35 test procedure involved 1) weighing the modified viscometer rotor (W1), 2) raising the cup with the preheated mud to the scribed line and rotating at 200 rpm for one minute, 3) stopping the rotation, removing the rotor from the mud, and allowing to drip for one minute, 4) wiping the bottom surface of the rotor clean, and weighing the rotor (W2), 5) replacing the rotor on the viscometer and raising the cup with the preheated surfactant solution to the scribed line and rotating at 200 rpm for ten minutes, 6) stopping the rotation, removing the rotor from the surfactant solution, and allowing to drip for one minute, 7) wiping the bottom surface of the rotor clean, weighing and recording the rotor (W3), and 8) calculating the Mud Removal Efficiency as MRE %=(W2−W3)/(W2−W1)×100

The effect of mud rheology would be expected to have an impact on mud removal, with thicker fluids being more difficult to remove. Similarly, oil:water ratio may also influence removal due to higher rheology with increased water content, or emulsifier/oil-wetting agent concentrations. The rheologies of several fluids were compared. Although more mud adhered to the metal surface with increased rheology, there was no correlation with mud removal efficiency. Increased adherence of mud to the metal surface with increased rheology showed the greatest correlation with gel strengths. However despite this, there was no effect seen in the overall mud removal.

The effect of surfactant concentration was considered in a series of tests. Most of the tests were run with 2% solutions of the surfactant to approximate levels used in field spacers. The results showed that for a metal surface, concentrations as low as 0.2% may be optimal. No benefit was seen with higher concentrations.

The effect of temperature was shown to have a significant effect on removal efficiency. Under ambient conditions the efficiency of removal was 20% or less. Removal improved as the temperature increased to 100–120° F. Above those temperatures no further improvements in removal were achieved. Optimum conditions were achieved at temperatures above 100° F.

The mud removal efficiency between seven surfactant compositions was compared. There was a high degree of variability, with sulfated polyoxyethylenated Alcohol (SPA) and Ether Carboxylate (EC) giving the best removal (Table 1). Alkyl benzenesulfonate (ABS) and Phosphated Polyoxyethylenated Alcohol (PPA) were also investigated further. Variations were seen between so called "equivalents", e.g. the enhanced mineral oil fluids; this is accounted for by differences in the chemistry of the base fluids.

TABLE 1

MRE % by Mud Type (API Fann 35)

|  | EC | ABS | AOS | NS | SLA | SPA | PPA | FAA |
|---|---|---|---|---|---|---|---|---|
| HDF 2000 | | | | | | | | |
| 60:40 (10 ppg) | 62.77 | 45.10 | 58.18 | 51.58 | 51.81 | 28.16 | 7.72 | −25.19 |
| 75:25 (10 ppg) | 72.74 | 12.64 | 59.77 | 44.79 | 80.54 | 19.82 | 9.24 | −78.26 |
| 90:10 (10 ppg) | 70.78 | 36.81 | 90.59 | 70.32 | 31.28 | 50.00 | 16.57 | −32.75 |
| LVT 200 | | | | | | | | |
| 60:40 (10 ppg) | 68.50 | 46.44 | 66.43 | 35.04 | 71.62 | 44.98 | 12.63 | |
| 75:25 (10 ppg) | 84.49 | 52.83 | 82.13 | 55.48 | 57.77 | 42.22 | −3.52 | |
| 90:10 (10 ppg) | 63.14 | 2.59 | 40.02 | 41.83 | 35.96 | 11.43 | −9.55 | |
| Escaid 110 | | | | | | | | |
| 60.40 (10 ppg) | 68.41 | 81.79 | 92.37 | 43.99 | 39.12 | 81.54 | −10.61 | |
| 75:25 (10 ppg) | 39.34 | 81.95 | 91.18 | 63.86 | 22.26 | 24.37 | −30.75 | |
| 90:10 (10 ppg) | 59.6 | 42.95 | 40.33 | 0.58 | 13.23 | 9.86 | −14.05 | |
| Biobase 110 | | | | | | | | |
| 60:40 (10 ppg) | −8.40 | −16.34 | 5.42 | 33.62 | 33.05 | −14.42 | −7.87 | −38.51 |
| 75:25 (10 ppg) | 72.71 | −3.7 | 87.13 | 18.27 | 39.42 | 37.98 | −11.62 | −48.64 |
| 90.10 (10 ppg) | 30.68 | 12.95 | 83.63 | 61.83 | 83.20 | 23.72 | 9.26 | −41.83 |

The mud removal efficiency of current commercial field surfactant packages A and B compared favorably with the generic surfactant compositions used (Table 2). Note that this comparison applied to results with the Fann 35 test on metal surfaces only.

TABLE 2

2% Surfactant Solution vs MRE% (HDF 2000 Base Fluid)

|  | Test 1 | Test 2 | Average |
|---|---|---|---|
| Water | −20.55 | −24.66 | −22.61 |
| Commercial Product A | 82.26 | 95.02 | 88.64 |
| Commercial Product B | 92.45 | 96.31 | 94.38 |
| ABS | 96.09 | 95.16 | 95.63 |
| SPA | 95.36 | 84.68 | 90.02 |
| PPA | 66.04 | 69.77 | 67.91 |
| EC | 75.45 | 64.22 | 69.84 |

Example 2

Tile Tests

Tile tests were conducted to determine mud removal from a porous surface to initially screen the effectiveness of the surfactants. Eight mud types were tested, including currently used commercial field packages A, B, and C. Table 3 summarizes the results obtained with 8 mud types. Each mud had a density of 12 ppg with a synthetic or oil:water ratio of 75:25. All tests were carried out at 180° F. The highlighted or shaded boxes indicate positive mud removal.

TABLE 3

Mud Removal by Individual Surfactants with Varying Mud Types

| Mud Removal Efficiency (%) | Water | A | B | C | Goldsurf | SPA | EC | PPA | ABS |
|---|---|---|---|---|---|---|---|---|---|
| HDF 2000 | −20 | −11 | 2 | 4 | −11 | −20 | 26 | −30 | 23 |
| LVT 200 | −18 | −16 | 4 | −22 | −24 | −23 | −6 | −28 | −11 |
| Escaid 110 | 6 | 8 | −4 | 1 | −2 | 10 | 2 | 6 | 3 |
| IO, Biobase 130 | −17 | −15 | −19 | −3 | −5 | 12 | 0 | −7 | −14 |
| LOA, C14:C16 | −12 | −5 | −8 | −9 | −3 | 24 | −3 | −6 | −13 |
| L. Paraffin (B 300) | −12 | 0 | | −5 | −7 | 71 | −27 | −8 | −3 |
| Ester (Finagreen) | −11 | −1 | −1 | −3 | 2 | 4 | 26 | 1 | −2 |
| Texas Diesel | | 6 | 3 | −2 | 1 | 4 | 3 | −4 | 5 |

No single surfactant solution achieved good mud removal from the porous tile surfaces. Currently used field surfactant packages A, B, and C were shown not only to be completely ineffective, but also detrimental. Note that total removal is 100%, and negative results denote additional material adhering to the surface.

Various mixtures of EC, SPA and MS, a mutual solvent, improved removal (Table 4) of the various oil/synthetic base fluids, but no single mix performed well in all cases. Therefore the surfactant compositions investigated do not provide a single product for all fluids.

TABLE 4

Mud Removal with Surfactant Mixtures of EC, SPA, and MS

| | Test 1 | Test 2 | Ave. |
|---|---|---|---|
| HDF 2000 (3:3:2) | 82.41 | 86.55 | 84.48 |
| LVT 2000 (3:3:2) | 67.75 | 78.68 | 73.22 |
| Escaid 110 (1:2:0) | −5.85 | 34.32 | 14.24 |
| Certrex 67 (3:3:2) | 47.97 | 45.74 | 46.85 |
| Texas Diesel (2:2:0) | 9.95 | 18.58 | 14.27 |
| LAO Biobase 130 (2:2:0) | 63.9 | 62.7 | 63.30 |
| LAO C14:C16 (2:2:1) | 74.95 | 71.2 | 73.08 |
| L. Parrafin Biobase 300 (2:2:1) | 84.21 | 84.15 | 84.18 |
| Ester, Fina (1.5:0.5:0) | 87.93 | 77.78 | 82.86 |

Note: Mixture ratios indicated in parathesis

Example 3

Base Fluid as Preflush System

Tests were conducted to determine the effectiveness of using the base fluid as a preflush spacer. As shown in Table 5, very poor removal was achieved.

TABLE 5

MRE % using Base Fluid as Preflush (75:25 Oil/synthetic/water ratio)

| | Test 1 | Test 2 | Ave. |
|---|---|---|---|
| HDF 2000 | 7.61 | 7.20 | 7.41 |
| LVT 2000 | 11.85 | 13.79 | 12.82 |
| Escaid 110 | 18.03 | 11.74 | 14.89 |
| Certrex 67 | 45.04 | 44.78 | 44.91 |
| Texas Diesel | 31.96 | 25.91 | 28.94 |
| LAO Biobase 130 | 14.29 | 10.81 | 12.55 |
| LAO C14:C16 | 32.36 | 29.02 | 30.69 |
| L. Parrafin Biobase 300 | 14.29 | 21.87 | 18.08 |
| IPAR 3 | 17.02 | 24.59 | 20.81 |
| Ester, Fina | 10.2 | 11.04 | 10.62 |

Example 4

D-Limonene Spacer

Tests were run to determine the effectiveness in mud removal of a D-limonene composition. Limonene is a monoterpene, a terpene hydrocarbon common to many naturally occurring essential oils. It is an isomeric molecule occurring in both d and l-forms. D-limonene, the most common form, is the major constituent of citrus oil. The tests indicated a high degree of mud removal (89.86 and 93.88%) but the surfaces were not water wet. Therefore a surfactant was required, either added to the D-limonene or in a secondary spacer

Example 5

Viscosifiers

The use of viscosifiers was tested. Truvis, an organophilic clay, does not viscosify neat D-limonene, but requires other additives such as water, surfactant and mutual solvent(s) (Table 6).

TABLE 6

12 ppg D-Limonene (4 ppb Truvis)

| Diesel Fluid 4 ppb Truvis | 1:1 EC:SPA 2% H2O | 2:2 EC:SPA 2% H2O | 1:1:1 EC:SPA:MS 2% H2O | 2:2:1 EC:SPA:MS 2% H2O | 1:1:2 EC:SPA:MS 2% H2O | 2:2:2 EC:SPA:MS 2% H2O | 1:1:3 EC:SPA:MS 2% H2O | 1:1:2 EC:SPA:U66 2% H2O | 1:1:3 EC:SPA:U66 2% H2O | 1:1:2 EC:SPA:W35 2% H2O |
|---|---|---|---|---|---|---|---|---|---|---|
| 600 | 14 | 25 | 25 | 28 | 28 | 24 | 32 | 13 | 17 | 20 |
| 300 | 8 | 15 | 16 | 18 | 19 | 15 | 24 | 7 | 11 | 11 |
| 200 | 5 | 12 | 12 | 14 | 16 | 11 | 20 | 5 | 8 | 8 |
| 100 | 3 | 8 | 10 | 10 | 11 | 7 | 16 | 2 | 5 | 5 |

Truvis was tested with a range of surfactant and mutual solvent concentrations (FIG. 15). The optimal mixture in terms of removal and rheology was 94% w/w D-limonene, 1% EC, 1% SPA, 2% Mutual Solvent (MS) and 2% water. MS was a key factor in making the Truvis yield, with EC surfactant and SPA surfactant aiding the process as well as controlling the gel strengths. Under the conditions of the tile tests, moderately high gels lead to poor movement of the spacer fluid at 300 rpm with resultant low removal. The EC and SPA depressed the gels to promote free movement of spacer across the tile surface.

Tests run with Truvis gave variable results dependent on mixing order of D-limonene and surfactant. If surfactant is added after viscosifying the D-limonene and water, the viscosity is shear dependent, too much shear resulting in loss of rheology. However if the surfactant is added prior to viscosifying, the rheology obtained is more predictable and not lost readily with shear (Table 7).

TABLE 7

Diesel Fluid - 2 stage removal

| Diesel Mud Stage 1 spacer | 12.0 ppg 100% D'L 4.3 ppb Truvis 2% H2O 1:1:2 EC:SPA:MS | 12.0 ppg 100% D'L 4.3 ppb Truvis 2% H2O 1:1:2 EC:SPA:MS | 12.0 ppg 100% D'L 4.3 ppb Truvis 2% H2O 1:1:2 EC:SPA:MS |
|---|---|---|---|
| 600 | 20 | 19 | 19 |
| 300 | 13 | 11 | 11 |
| 200 | 10 | 9 | 9 |
| 100 | 8 | 7 | 7 |
| 6 | 4 | 3 | 3 |
| 3 | 3 | 3 | 3 |
| 10" Gel | 5 | 4 | 4 |
| 10" Gel | 4 | 4 | 4 |
| PV | 7 | 8 | 8 |
| YP | 6 | 3 | 3 |
| Stage 2 Spacer | 12.0 ppg, Driscal D XL Spacer (2) 2:2 EC:SPA | 12.0 ppg, Driscal D XL Spacer (2) 2:2 EC:SPA | 12.0 ppg, Driscal D XL Spacer (2) 2:2 EC:SPA |
| Stage 1 Removal | 51.12 | 81.75 | 86.15 |
| Stage 2 Removal | 61.43 | 86.13 | 90.77 |
| Water-wet | Yes | Yes | Yes |

With as low rheologies as possible, the removal for the diesel was in the 86–91% range. The second stage gave a small increase in removal as well as water wetting the mud residue on the tile surface. The Biobase 130 fluid with the same spacers had lower removal in the 66–75% range with water-wet surface (Table 8).

TABLE 8

Biobase 130 Fluid - 2 stage removal

| BioBase 130 | D'L (1) (4,3 Truvis) 12 ppg, Driscal D XL Spacer (2) 2:2 EC:SPA | D'L (1) (4,3 Truvis) 12 ppg, Driscal D XL Spacer (2) 2:2 EC:SPA |
|---|---|---|
| Stage 1 MRE % | 76.85 | 66.40 |
| Stage 2 MRE % | 73.38 | 66.00 |
| Water-wet | Yes | Yes |

Note: Stage 1 as for Table 7

A range of organophilic clays was tested for performance. Truvis was identified as the best product, with Vistone and Truvis HT also providing viscosity. Other organophilic clays tested showed various negative results, i.e. did not viscosify the spacer at all or did not provide the necessary rheological profile such as non-progressive gels.

An aluminum phosphate ester (AES) complex that forms rapid gels in contact with aqueous based activators such as potassium hydroxide or sodium carbonate was also effective in viscosifying D-Limonene.

The use of second stage surfactant spacers was tested. Tables 7 and 8 show results obtained using a secondary weighted surfactant spacer after the weighted D-limonene spacer. The water-soluble synthetic polymer, Driscal D, was used to viscosify the secondary spacer. The secondary spacer increased the diesel mud removal by the primary D-limonene spacer and left the surfaces water wet. In two of the three examples shown the removal was already high with the primary spacer. With the Biobase 130 fluid, the removal by D-limonene was lower. No further removal was achieved by the secondary surfactant spacer. In one case, the surfactant spacer caused an weight increase in the tile, probably due to increased water wetting. Therefore additional mud removal by the secondary spacer may be hidden due to additional water wetting.-

Various commonly used water soluble viscosifying polymers were investigated for use as surfactant spacer viscosifiers. These included natural and natural modified polymers such as hydroxy-ethyl cellulose (HEC) and Guar Gum, and biopolymers such xanthan and scleroglucan gums. All caused Barite and other weighting materials, such as hematite or manganese oxide, to coat out on both the metal and porous surfaces Table 9.

TABLE 9

Water Soluble Polymers and Barite Coating

|  | XL Spacer Xanthan 12.4 ppg | XL Spacer Scleroglucan 12.4 ppg | XL Spacer Driscal 12.4 ppg | XL Spacer Dispersable Xanthan 12.4 ppg | XL spacer HEC 12.4 ppg | XL spacer Guar Gum 12.4 ppg | XL spacer D144 12.4 ppg |
|---|---|---|---|---|---|---|---|
| Tile (Ww) | 38.27 | 40.02 | 37.68 | 41.95 | 38.93 | 39.51 | 43.5 |
| Tile (Wf) | 38.84 | 40.86 | 37.82 | 43.25 | 39.24 | 40 | 44.2 |
| Barite coating | 0.57 | 0.84 | 0.14 | 1.3 | 0.31 | 0.49 | 0.7 |

Barite coating only occurred with the viscosified second stage spacer, not with the primary D-limonene spacer. Typically, the D-limonene spacer effectively cleaned the metal rotor and tile, but a heavy coating of Barite was deposited during exposure of the surfaces to the secondary spacer. When Driscal D, a synthetic polymer, was used to viscosify the secondary spacer, the coating phenomenon was minimized or not apparent.

Example 6

D-Limonene and Dipentene

The effectiveness of D-limonene was compared with another terpene, Dipentene, a mixture of D- and L-limonene derived from pine trees. Mixtures of the two were also made. Aluminum phosphate ester and Truvis HT were both found to be effective. Both viscosify Dipentene giving similar rheologies and removal to those with D-limonene (Tables 10 and 11). Truvis HT also provides good rheology with equivalent removal to that of D-limonene with Truvis. The removal efficiency of Dipentene is similar to that of D-limonene, as are mixtures of the two (Table 10).

TABLE 10

Removal with Dipentene and D-Limonene

| Diesel Mud 180° F. | 100% D'Limonene 0.35% AES, 0.14% KOH, 12 ppg | 80% D'Limonene 20% Dipentene 0.38% AES, 0.152% KOH, 12.0 ppg | 60% D'Limonene 40% Dipentene 0.38% AES, 0.152% KOH, 12.0 ppg | 40% D'Limonene 60% Dipentene 0.38% AES, 0.152% KOH, 12.0 ppg | 20% D'Limonene, 80% Dipentene 0.38% AES, 0.152% KOH, 12.0 ppg | 100% Dipentene 0.38% AES, 0.152% KOH, 12.0 ppg |
|---|---|---|---|---|---|---|
| 600 | 21 | 27 | 30 | 42 | 30 | 29 |
| 300 | 15 | 18 | 20 | 28 | 20 | 19 |
| 200 | 14 | 8 | 17 | 20 | 15 | 7 |
| 100 | 11 | 5 | 13 | 14 | 11 | 4 |
| 6 | 2 | 1 | 5 | 5 | 11 | 1 |
| 3 | 1 | 0 | 5 | 4 | 11 | 1 |
| Gel (10") | 2 | 1 | 4 | 4 | 4 | 1 |
| Gel (10") | 3 | 2 | 3 | 3 | 2 | 1 |
| PV | 6 | 9 | 10 | 14 | 10 | 10 |
| YP | 9 | 9 | 10 | 14 | 10 | 9 |
| MRE % | 99.03 | 78.99 | 96.00 | 90.48 | 77.78 | 83.04 |

TABLE 11

Dipentene and Truvis HT

| | Diesel 180° F. | 100% Dipentene 4.0 ppb Truvis HT 2% H2O 1:1:2 EC:SPA:MS 12.0 ppg | 100% Dipentene 4.25 ppb Truvis HT 2% H2O 1:1:2 EC:SPA:MS 12.0 ppg | 100% Dipentene 4.5 ppb Truvis HT 2% H2O 1:1:2 EC:SPA:MS 12.0 ppg | 100% Dipentene 4.3 ppb Truvis HT 2% H2O 1:1:2EC:SPA:MS 12.0 ppg |
|---|---|---|---|---|---|
| 600 | | 23 | 25 | 25 | 25 |
| 300 | | 13 | 15 | 15 | 15 |
| 200 | | 10 | 12 | 11 | 11 |
| 100 | | 7 | 8 | 7 | 8 |
| 6 | | 2 | 2 | 1 | 3 |
| 3 | | 1 | 2 | 1 | 3 |
| 10" Gel | | 3 | 3 | 2 | 3 |
| 10" Gel | | 3 | 5 | 4 | 4 |
| PV | | 10 | 10 | 10 | 10 |
| YP | | 3 | 5 | 5 | 5 |
| MRE % | | 97.08 | 67.55 | 25.84 | 70.79 |

Example 7

Flash Points of D-limonene Spacers

The flash points of D-limonene spacers were tested using the Penske Martin's closed cup method. D-limonene had a flashpoint of 128° F. The surfactant composition in the D-limonene first stage spacer has volatile components and therefore reduced the flash point. The MS was replaced with an alkyl ethoxylated alcohol, AEA which raised the flash point from 108° F. to 130° F. Various high flash point fluids were added to the D-limonene to attempt to increase the flash point. An additional solvent, ethylene glycol monobutyl ether, EGMBE, was also tested (Table 12).

TABLE 12

Solvent and Solvent Spacer Flash Points

| | Flash Point (° F.) |
|---|---|
| D-Limonene | 128 |
| D-Limonene, 2% H$_2$O | 130 |
| D-Limonene, 4% H$_2$O | 124 |
| D-Limonene, 6% HO | 126 |
| 95% D-Lim, 2% H$_2$O, 1% EC, 1% SPA, 2% MS | 108 |
| 95% D-Lim, 2% H$_2$O, 1% EC, 1% SPA, 1% MSC | 130 |
| 95% D-Lim, 2% H$_2$O, 1% EC, 1% SPA, 2% MS, 4.3 ppb Truvis | 120 |
| 95% D-Lim, 2% H$_2$O, 1% EC, 1% SPA, 2% MS, 4.3 ppb Truvis, Barite (12.0 ppg) | 145 |
| 85% D-Lim, 15% base oil (Biobase 300, Ester) | 130, 127 |
| 70% D-Lim, 30% base oil (Biobase 300, Ester, Biobase 130, HDF 200) | 136, 126, 136, 132 |
| 49% D-Lim, 44% Diesel, 1% H$_2$O, 1% EC, 1% SPA, 1% AEA, 3% EGMBE | 133 |
| 33% D-Lim, 60% Diesel, 1% H$_2$O, 1% EC, 1% SPA, 1% AEA, 3% EGMBE | 136 |
| 29% D-Lim, 65% Diesel, 1% H$_2$O, 1% EC, 1% SPA, 1% AEA, 3% EGMBE | 141 |
| 31% D-Lim, 65% Diesel, 1% H$_2$O, 1% EC, 1% SPA, 1% AEA | 143 |

Various high flash point fluids were added to the D-limonene to attempt to increase the flash point. Both water, which is immiscible in the D-limonene, and base oils up to 30% w/w did not provide significant improvements, even with the ester which itself had a flash point >300° F. The preferred dilution for suppressing the D-limonene flash point is in the region of 60–65%.

Example 8

D-Limonene Spacers with Base Fluid

Moderate dilutions of the D-limonene spacer with base fluids were tested. The dilutions appeared to have no detrimental effect and appeared to improve removal (Table 13).

TABLE 13

Dilution of D-Limonene Spacer with Base Fluid

| Diesel | MRE % | Water-wet |
|---|---|---|
| D'Limonene, 4.1 ppb Truvis 2% H2O, 1:1:1 EC:SPA:AEA, 5% BioBase 300, 12.0 ppg (180° F.) | 93.23 | Yes |
| D'Limonene, 4.1 ppb Truvis 2% H2O, 1:1:1 EC:SPA:AEA, 9% BioBase 300, 12.0 ppg (180° F.) | 108.33 | Water wet |
| D'Limonene, 4.1 ppb Truvis 2% H2O, 1:1:1 EC:SPA:AEA, 15% BioBase 300, 12.0 ppg (180° F.) | 74.29 | Water wet |
| D'Limonene, 4.1 ppb Truvis 2% H2O, 1:1:1 EC:SPA:AEA, 25% BioBase 300, 12.0 ppg (180° F.) | 69.48 | Not Water wet |
| D'Limonene, 4.1 ppb Truvis 2% H2O, 1:1:1 EC:SPA:AEA, 46% BioBase 300, 12.0 ppg (180° F.) | 45.31 | Water Wet |

These tests indicate that the D-limonene spacer can be formulated to give good removal with high levels of base fluid dilution, thereby providing a high flash point, which may be required for certain areas. Under the conditions of the laboratory tests, the mud removal is directly effected by the spacer viscosity, the higher the gel strengths the lower the removal. The Truvis gave a higher yield with increasing base oil content and therefore the Truvis concentration had to be reduced with increasing base oil content. In order to standardize results, the Truvis concentrations were modified to provide the lowest rheology to suspend the barite. During the tests slight settling of the barite was considered acceptable in order to achieve the lowest rheology. Under field conditions settling would not occur while the fluid is being pumped.

TABLE 14

Effect of D-Limonene Spacer Diesel Content on Mud

| Diesel Mud 180° F. | D'Limonene, 4.3 ppb Truvis, 1% H2O, 1:1:1 EC:SPA:AEA, 46% Diesel 12.0 ppg | D'Limonene, 4.5 ppb Truvis, 1% H2O, 1:1:1 EC:SPA:AEA, 65% Diesel 12.0 ppg | D'Limonene, 4.2 ppb Truvis, 1% H2O, 1:1:1 EC:SPA:AEA, 65% Diesel 12.0 ppg | D'Limonene, 3.7 ppb Truvis, 1% H2O, 1:1:1 EC:SPA:AEA, 65% Diesel 12.0 ppg | D'Limonene, 3.2 ppb Truvis, 1% H2O, 1:1:1 EC:SPA:AEA, 65% Diesel 12.0 ppg | D'Limonene, 3.5 ppb Truvis, 1% H2O, 1:1:1:2 EC:SPA: AEA:EGMBE, 63% Diesel 12.0 ppg | D'Limonene, 3.7 ppb Truvis, 1% H2O, 2:3:1 EC:SPA:AEA, 65% Diesel 12.0 ppg |
|---|---|---|---|---|---|---|---|
| 600 | 32 | 35 | 33 | 32 | 27 | 24 | 28 |
| 300 | 22 | 25 | 22 | 20 | 17 | 14 | 17 |
| 200 | 18 | 20 | 18 | 16 | 13 | 10 | 13 |
| 100 | 14 | 15 | 9 | 12 | 9 | 7 | 9 |
| 6 | 6 | 7 | 6 | 4 | 3 | 1 | 3 |
| 3 | 6 | 6 | 5 | 3 | 2 | 1 | 2 |
| Gel (10") | 3 | 4 | 3 | 4 | 3 | 3 | 3 |
| Gel (10") | 7 | 11 | 9 | 5 | 2 | 3 | 3 |
| PV | 10 | 10 | 11 | 12 | 10 | 10 | 11 |
| YP | 12 | 15 | 11 | 8 | 7 | 4 | 6 |
| MRE % | 47.52 | 7.21 | 31.58 | 51.24 | 68.10 | 78.72 | 51.22 |
| Water-wet | Yes | Yes | Yes | Yes | Yes | Yes | Yes |
| Setting | Soft | Soft | No | No | Yes | Hard | Yes |

With 65% diesel dilution, the first stage spacer gives good removal (79%), with low rheology and severe settling of Barite, and 51% removal but with minimal settling. The tile surface was water-wet in both. The relatively clean tile surfaces suggest that these high levels of base fluid would produce good results in the field thereby allowing formulation of higher flash point spacers if required.

Example 9

High Density Spacers

The use of high density spacers was tested. 20 ppg spacers were tested on a 19 ppg diesel based field mud from Kuwait. The results showed that good performance can still be achieved at high density. Best results were obtained using 3.0–3.2 ppb Truvis in the first stage spacer and 0.5 ppb Driscal D, a water-soluble synthetic polymer, in the second stage Table 15 and 16).

TABLE 15

Rheology of 20 ppg D-Limonene Spacers

| 20 ppg Diesel Kuwait Mud | 100% D'Limonene 4.3 ppb Truvis 2% H2O, 1:1:2 EC:SPA:MS, 20.0 ppg | 100% D'Limonene 3.2 ppb Truvis 1% H2O, 1:1:1 EC:SPA:MS, 20.0 ppg | 100% D'Limonene 3.5 ppb Truvis 2% H2O, 1:1:2 EC:SPA:MS, 20.0 ppg | 100% D'Limonene 2.0 ppb Truvis 2% H2O, 1:1:2 EC:SPA:MS, 20.0 ppg | 100% D'Limonene 2.5 ppb Truvis 2% H2O, 1:1:2 EC:SPA:MS, 20.0 ppg | 100% D'Limonene 3.0 ppb Truvis 2% H2O, 1:1:2 EC:SPA:MS, 20.0 ppg |
|---|---|---|---|---|---|---|
| 600 | 64 | 56 | 52 | 35 | 44 | 54 |
| 300 | 38 | 28 | 37 | 21 | 23 | 30 |
| 200 | 29 | 18 | 30 | 14 | 16 | 22 |
| 100 | 20 | 10 | 25 | 8 | 10 | 15 |
| 6 | 12 | 2 | 14 | 1 | 2 | 4 |
| 3 | 12 | 1 | 13 | 1 | 1 | 3 |
| 10" Gel | 6 | 2 | 15 | 2 | 1 | 3 |
| 10" Gel | 14 | 4 | 18 | 2 | 3 | 9 |
| PV | 26 | 27 | 15 | 14 | 21 | 24 |
| YP | 12 | 1 | 22 | 7 | 2 | 6 |

TABLE 16

Driscal D Spacers

| 20 ppg Diesel Kuwait Mud | XL Spacer Driscal D (2 ppb) 2:2: EX:SPA 20.0 ppg | XL Spacer Driscal D (0.5 ppb) 2:2: EX:SPA 20.0 ppg | XL Spacer Driscal D 0.5( ppb) 2:2: EX:SPA 20.0 ppg | XL Spacer Driscal D (0.75 ppb) 2:2: EX:SPA 20.0 ppg |
|---|---|---|---|---|
| 600 | >600 | 117 | 134 | 276 |
| 300 | 198 | 60 | 64 | 135 |
| 200 | 131 | 40 | 42 | 85 |
| 100 | 67 | 21 | 22 | 40 |
| 6 | 7 | 3 | 3 | 4 |
| 3 | 5 | 2 | 2 | 3 |
| 10" Gel | 6 | 3 | 3 | 4 |
| 10" Gel | 9 | 4 | 4 | 5 |
| PV | | 57 | 70 | 141 |
| YP | | 3 | −6 | −6 |

Despite negative yield points, common in very high density fluids, settling was not a problem with the Driscal D.

The first stage spacer with 3.2 ppb Truvis still provides efficient removal and water wetting properties at 20 ppg density Table 17 and 18. However the second stage spacer with 0.5 ppg Driscal D at 20 ppg exhibits the same barite coating properties found with non-synthetic polymers at 12 ppg densities. This resulted in large weight increases in the tiles between the first and second stages. The removal and water-wetting capability achieved by the first stage spacer indicates that the second stage spacer is not required.

TABLE 17

Removal with 20 ppg First Stage Spacer

| | D'Limonene 4.3 ppb Truvis 2% H2O 1:1:2 EC:SPA:MS 20.0 ppg | D'Limonene 3.2 ppb Truvis 1% H2O 1:1:1 EC:SPA:MS 10% Diesel, 20.0 ppg |
|---|---|---|
| Diesel Mud From Kuwait 19.0 ppg | | |
| MRE % | 4.48 | 89.93 |
| Settling | No | Soft |
| Barite Coating | Heavy | Light |

TABLE 18

Removal with Two Stage 20 ppg Spacers

| | 100% D'Limonene (1) (2.0 ppb Truvis) 20.0 ppg, Driscal (0.5 ppb) XL Spacer (2) 2:2 EC:SPA | 100% D'Limonene (1) (2.5 ppb Truvis) 20.0 ppg, Driscal (0.5 ppb) XL Spacer (2) 2:2 EC:SPA | 100% D'Limonene (1) (3.0 ppb Truvis) 20.0 ppg, Driscal (0.5 ppb) XL Spacer (2) 2:2 EC:SPA |
|---|---|---|---|
| Diesel Mud From Kuwait 19.0 ppg | | | |
| MRE % - Stage 1 | 46.60 | 45.45 | 64.22 |
| MRE % - Stage 2 | −35.92 | −36.90 | 3.45 |
| Water-wet Barite | Yes | Yes | Yes |
| Settling | Hard settling in 1st stage | Hard settling in 1st stage | No settling in both stages |
| Barite Coating | Heavy coating in 2nd stage | Heavy coating in 2nd stage | Heavy coating in 2nd stage |

Example 10
D-Limonene Spacer with Synthetic and Enhanced Mineral Oil Fluid D-limonene spacers were tested with the range of enhanced mineral oil and synthetic fluids. In a diesel system, the base surfactant/solvent mix of 96% D-limonene, 1% EC, 1% SPA, 1% AEA and 1% water, gave the highest removal of 95% (Table 19). Addition of 10% diesel and/or EGMBE reduced the removal efficiency.

TABLE 19

Removal of Diesel Mud

| Diesel Mud 180° F. | D'Limonene, 4.1 ppb Truvis, 2% H2O, 1:1:1 EC:SPA:AEA, 12.0 ppg | D'Limonene, 4.5 ppb Truvis, 1% H2O, 1:1:1:2 EC:SPA:AEA:EGMBE, 10% Diesel 12.0 ppg | D'Limonene, 4.5 ppb Truvis, 1% H2O, 1:1:1 EC:SPA:AEA, 10% Diesel 12.0 ppg | D'Limonene, 4.5 ppb Truvis, 1% H2O, 1:1:1:2 EC:SPA:AEA:EGMBE, 12.0 ppg |
|---|---|---|---|---|
| 600 | 22 | 24 | 25 | 24 |
| 300 | 15 | 17 | 17 | 15 |
| 200 | 13 | 13 | 14 | 12 |
| 100 | 11 | 10 | 10 | 12 |
| 6 | 6 | 4 | 5 | 4 |
| 3 | 5 | 4 | 5 | 4 |
| Gel (10") | 6 | 3 | 6 | 3 |
| Gel (10") | 7 | 4 | 5 | 4 |
| PV | 7 | 7 | 8 | 9 |
| YP | 8 | 10 | 9 | 6 |
| MRE % | 94.67 | 78.52 | 69.40 | 53.12 |

TABLE 19-continued

Removal of Diesel Mud

| Diesel Mud 180° F. | D'Limonene, 4.1 ppb Truvis, 2% H2O, 1:1:1 EC:SPA:AEA, 12.0 ppg | D'Limonene, 4.5 ppb Truvis, 1% H2O, 1:1:1:2 EC:SPA:AEA:EGMBE, 10% Diesel 12.0 ppg | D'Limonene, 4.5 ppb Truvis, 1% H2O, 1:1:1 EC:SPA:AEA, 10% Diesel 12.0 ppg | D'Limonene, 4.5 ppb Truvis, 1% H2O, 1:1:1:2 EC:SPA:AEA:EGMBE, 12.0 ppg |
|---|---|---|---|---|
| Water-wet | Yes | Yes | Yes | Yes |
| Setting | Soft | No | No | No |

In a Escaid 110 fluid, the base surfactant/solvent mix of 1% EC, 1% SPA, 1% AEA and 2% D-Limonene gave the best results Table 20. Additions of 10% diesel gave only a minor reduction in removal, whereas 2% EGMBE caused a significant reduction.

TABLE 20

Removal of Escaid 110 Mud

| Escaid Mud 180° F. | D'Limonene, 4.0 ppb Truvis, 2% H2O, 1:1:1 EC:SPA:AEA, 12.0 ppg | D'Limonene, 4.3 ppb Truvis, 1% H2O, 1:1:1 EC:SPA:AEA, 1% Escaid 110 12.0 ppg | D'Limonene, 4.5 ppb Truvis, 1% H2O, 1:1:1:2 EC:SPA:AEA,EGMBE 10% Escaid 110 12.0 ppg | D'Limonene, 4.5 ppb Truvis, 1% H2O, 1:1:1:2 EC:SPA:AEA,EGMBE 12.0 ppg |
|---|---|---|---|---|
| 600 | 23 | 21 | 24 | 23 |
| 300 | 16 | 12 | 15 | 15 |
| 200 | 13 | 10 | 12 | 12 |
| 100 | 10 | 7 | 10 | 10 |
| 6 | 5 | 2 | 4 | 4 |
| 3 | 4 | 2 | 4 | 4 |
| Gel (10") | 5 | 2 | 4 | 3 |
| Gel (10") | 5 | 5 | 4 | 4 |
| Pv | 7 | 9 | 9 | 8 |
| YP | 9 | 3 | 6 | 7 |
| MRE % | 72.71 | 65.87 | 65.26 | 44.55 |
| Water-wet | Yes | Yes | Yes | Yes |
| Setting | Slight | Soft | | |

In a Biobase 130 fluid, the base surfactant/solvent mix of 1% EC, 1% SPA, 1% AEA and 2% water with 95% D-Limonene gave the best results (Table 21). Additions of 10% diesel gave only a minor reduction in removal, as did 2% EGMBE.

TABLE 21

Removal of Biobase 130 Mud

| Biobase 130 180° F. | 100% D'Limonene, 4.3 ppb Truvis, 2% H2O, 1:1:2 EC:SPA:AEA, 12.0 ppg | D'Limonene, 4.3 ppb Truvis, 1% H2O, 1:1:1 EC:SPA:AEA, 10% Biobase 130 12.0 ppg | D'Limonene, 4.5 ppb Truvis, 1% H2O, 1:1:1:2 EC:SPA:AEA,EGMBE, 10% Biobase 130 12.0 ppg | D'Limonene, 4.5 ppb Truvis, 1% H2O, 1:1:1:2 EC:SPA:AEA,EGMBE, 12.0 ppg |
|---|---|---|---|---|
| 600 | 20 | 21 | 22 | 23 |
| 300 | 13 | 12 | 14 | 15 |
| 200 | 10 | 9 | 11 | 12 |
| 100 | 8 | 7 | 8 | 10 |
| 6 | 4 | 2 | 3 | 4 |
| 3 | 3 | 2 | 3 | 4 |
| Gel (10") | 5 | 2 | 3 | 3 |
| Gel (10") | 4 | 3 | 4 | 4 |
| PV | 7 | 9 | 9 | 8 |

TABLE 21-continued

Removal of Biobase 130 Mud

|  | 100% D'Limonene, 4.3 ppb Truvis, 2% H2O, 1:1:2 EC:SPA:AEA, 12.0 ppg | D'Limonene, 4.3 ppb Truvis, 1% H2O, 1:1:1 EC:SPA:AEA, 10% Biobase 130 12.0 ppg | D'Limonene, 4.5 ppb Truvis, 1% H2O, 1:1:1:2 EC:SPA:AEA,EGMBE, 10% Biobase 130 12.0 ppg | D'Limonene, 4.5 ppb Truvis, 1% H2O, 1:1:1:2 EC:SPA:AEA,EGMBE, 12.0 ppg |
|---|---|---|---|---|
| Biobase 130 180° F. |  |  |  |  |
| YP | 6 | 3 | 6 | 7 |
| MRE % | 76.85 | 82.68 | 70.63 | 68.59 |
| Water-wet | Yes | Yes | Yes | Yes |
| Setting | Soft | Slight | Soft | Soft |

In a Biobase 300 fluid, the base surfactant/solvent mix of 1% EC, 1% SPA, 1% AEA and 2% water with 95% D-Limonene again gave the best results (Table 22).

TABLE 22

Removal of Biobase 300 Mud

|  | 100% D'Limonene, 4.3 ppb Truvis, 2% H2O, 1:1:1 EC:SPA:AEA, 12.0 ppg | D'Limonene, 4.3 ppb Truvis, 1% H2O, 1:1:1 EC:SPA:AEA, 10% Biobase 300 12.0 ppg | D'Limonene, 4.5 ppb Truvis, 1% H2O, 1:1:1:2 EC:SPA:AEA,EGMBE, 10% Biobase 300 12.0 ppg | D'Limonene, 4.5 ppb Truvis, 1% H2O, 1:1:1:2 EC:SPA:AEA,EGMBE, 12.0 ppg |
|---|---|---|---|---|
| Biobase 300 180° F. |  |  |  |  |
| 600 | 21 | 23 | 26 | 23 |
| 300 | 13 | 14 | 17 | 15 |
| 200 | 10 | 11 | 13 | 12 |
| 100 | 8 | 9 | 11 | 10 |
| 6 | 3 | 3 | 6 | 4 |
| 3 | 3 | 3 | 5 | 4 |
| Gel (10") | 4 | 3 | 6 | 3 |
| Gel (10") | 3 | 3 | 6 | 4 |
| PV | 8 | 9 | 9 | 8 |
| YP | 5 | 5 | 8 | 7 |
| MRE % | 81.86 | 61.58 | 54.75 | 64.95 |
| Water-wet | Yes | Yes | Yes | Yes |
| Setting | Soft | Soft | No | No |

In an Ester Fluid, the base surfactant/solvent mix again gave the best removal of 98% Table 23 (FIG. 32). Additions of 10% base fluid and/or 2% EGMBE caused minor reductions in removal.

TABLE 23

FIG. 32. Removal of Fina Ester

|  | D'Limonene, 4.5 ppb Truvis, 1% H2O, 1:1:1 EC:SPA:MSC, 12.0 ppg | D'Limonene, 4.3 ppb Truvis, 1% H2O, 1:1:1 EC:SPA:MSC, 10% Fina Ester 110 12.0 ppg | D'Limonene, 4.5 ppb Truvis, 1% H2O, 1:1:1:2 EC:SPA:AEA,EGMBE, 10% Fina Ester 12.0 ppg | D'Limonene, 4.5 ppb Truvis, 1% H2O, 1:1:1:2 EC:SPA:AEA,EGMBE, 12.0 ppg |
|---|---|---|---|---|
| Fina Ester 180° F. |  |  |  |  |
| 600 | 21 | 21 | 25 | 23 |
| 300 | 13 | 12 | 16 | 15 |
| 200 | 10 | 8 | 12 | 12 |
| 100 | 8 | 6 | 9 | 10 |
| 6 | 3 | 1 | 4 | 4 |
| 3 | 3 | 1 | 4 | 4 |
| Gel (10") | 4 | 2 | 3 | 3 |
| Gel (10") | 3 | 2 | 5 | 4 |
| PV | 8 | 9 | 9 | 8 |
| YP | 5 | 3 | 7 | 7 |
| MRE % | 98.26 | 88.17 | 77.88 | 77.08 |

TABLE 23-continued

FIG. 32. Removal of Fina Ester

|  | D'Limonene, 4.5 ppb Truvis, 1% H2O, 1:1:1 EC:SPA:MSC, 12.0 ppg | D'Limonene, 4.3 ppb Truvis, 1% H2O, 1:1:1 EC:SPA:MSC, 10% Fina Ester 110 12.0 ppg | D'Limonene, 4.5 ppb Truvis, 1% H2O, 1:1:1:2 EC:SPA:AEA,EGMBE, 10% Fina Ester 12.0 ppg | D'Limonene, 4.5 ppb Truvis, 1% H2O, 1:1:1:2 EC:SPA:AEA,EGMBE, 12.0 ppg |
|---|---|---|---|---|
| Fina Ester 180° F. |  |  |  |  |
| Water-wet | Yes | Yes | Yes | Yes |
| Setting | Soft | Slight | No | No |

In all the five fluids tested, the optimum mud removal was achieved by the base mixture of 96% D-limonene, with 1% each of EC, SPA, AEA. and water. Additions of 10% base fluid and/or EGMBE provided no benefit.

The D-limonene containing spacers, with wetting surfactant, provide the best overall performance in terms of mud removal when compared to surfactant spacers and currently used field surfactant packages. The spacers efficiently water-wet both metal and porous surfaces as well as residual traces of mud or mud cake. Therefore a field package may comprise only a single stage multi-purpose spacer.

Optimum results were achieved where the liquid phase of the first stage spacer was blended with or contained 96% w/w D-limonene, and 1% w/w each of the surfactant ether carboxylate and the surfactant sulphated polyoxyethlylenated alcohol, alkyl ethoxylated alcohol, and water.

For the weight range tested, weighted single stage solvent spacers are as efficient in mud removal as unweighted spacers. The spacer can be effectively viscosified using certain organophilic clays, such as Truvis, Truvis HT and Vistone, and weighted up to a density of 20 ppg.

Under the test conditions at 180° F., the spacer rheology has a direct effect on removal, the higher the rheology, the lower the removal. For optimum removal the rheology should be as low as possible without having significant barite sag. With different flow regimes downhole, the effect of minor changes in rheology may not be so critical. Truvis, along with the surfactant and solvent package, provides the rheological profile to optimize mud removal. The D-limonene package can be diluted up to 10% w/w with certain base fluids to improve removal where needed.

With a well formulated first stage spacer comprising D-limonene and a surfactant package, effective removal and water wetting may be achieved without use of the secondary spacer. However under field conditions, which will be more stringent than those in the laboratory, this secondary spacer may be required to optimize removal and ensure water-wetting of surfaces.

The surfactant spacer can be effectively viscosified using a range of water-soluble polymers, preferably synthetic, and weighted up to 20 ppg. Non-synthetic polymers and biopolymers cause weight materials such as barite, hematite and manganese oxide to coat out on surfaces. This would be detrimental to the bonding of cement to the casing or exposed formation. Driscal D, a synthetic polymer, does not cause this coating phenomenon.

Other variations and aspects of the invention will be apparent from the further description herein and appended claims. Although the present invention has been described by several embodiments, various changed and modifications may be suggested to one skilled in the art. It is intended that the present invention encompasses such changes and modifications as fall within the scope of the claims.

What is claimed is:

1. The method of reducing oil-containing residue in or on a wellbore surface comprising
   contacting wellbore surface with a wellbore fluid composition comprising a terpene composition and surfactant; and then
   contacting the wellbore surface with an aqueous fluid comprising a viscosifying organic polymer and wetting surfactant.

2. The method of claim 1 in which the terpene composition is selected from the group consisting of cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof.

3. The method of claim 2 in which the terpene composition comprises at least 85 percent of the wellbore fluid composition.

4. The method of claim 1 in which the surfactant is selected from the group of anionic and non-ionic surfactants.

5. The method of claim 4 in which the terpene composition is selected from the group consisting of d-limonene, dipentene, and mixtures thereof.

6. The method of claim 5 in which the surfactant is selected from the group consisting of sulphated polyoxyethylenated alcohol, alkyl ethoxylated alcohol, ether carboxylate surfactant, and mixtures thereof.

7. The method of claim 6 in which the viscosifying organic polymer is a synthetic organic polymer.

8. The method of claim 7 in which the surfactant in the first fluid is present in concentration of from about 0.1 to 15 percent, the terpene composition is present in concentration of at least 85 percent, and 0 to about 4 percent water and the second fluid comprises an aqueous based solution containing about 0.1 to about 12 percent wetting surfactant and a water soluble polymer of acrylic acid.

9. A method of reducing oil-containing residue in or on a wellbore surface comprising
   contacting wellbore surface with a wellbore fluid composition comprising a terpene composition selected from the group consisting of cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof; a surfactant; and a viscosifier, and then
   contacting the wellbore surface with an aqueous fluid comprising a viscosifying organic polymer and wetting surfactant.

10. The method of claim 9 wherein the first or second fluid or both further comprises a weighting agent.

11. The method of claim 10 in which the terpene composition comprises at least 85 percent of the fluid and is selected from the group consisting of d-limonene and dipentene; the surfactant is selected from the group of anionic and non-ionic surfactants; and the wetting surfactant comprises 0.1–12 percent of the second fluid.

12. The method of clean-up of oil-containing residue from an open-hole reservoir section of a well comprising contacting the reservoir section with a wellbore fluid composition comprising a terpene composition, a viscosifier, and a surfactant, wherein the terpene composition is selected from the group consisting of cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof; the method further comprising contacting the reservoir section with an aqueous fluid comprising a viscosifying organic polymer and wetting surfactant.

13. The method of claim 12 wherein the terpene composition comprises at least 85 percent of the wellbore fluid composition and is selected from the group of d-limonene and dipentene, and mixtures thereof; and wherein the surfactant is selected from the group consisting of sulphated polyoxyethylenated alcohol, alkyl ethoxylated alcohol, ether carboxylate surfactant, and mixtures thereof; and wherein said viscosifying organic polymer is a synthetic organic polymer.

14. The method of displacing an oil-based or synthetic-based mud in an open-hole reservoir section of a well comprising
    injecting a wellbore fluid composition comprising a terpene composition, a viscosifier, and a surfactant, wherein the terpene composition is selected from the group consisting of cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof; the method further comprising injecting an aqueous fluid comprising a viscosifying organic polymer and wetting surfactant.

15. The method of claim 14 wherein the terpene composition comprises at least 85 percent of the wellbore fluid composition and is selected from the group of d-limonene and dipentene, and mixtures thereof; and wherein the surfactant is selected from the group consisting of sulphated polyoxyethylenated alcohol, alkyl ethoxylated alcohol, ether carboxylate surfactant, and mixtures thereof; and where in said viscosifying organic polymer is a synthetic organic polymer.

16. The method of displacing an oil-based or synthetic based mud to a brine or base-oil or viscosified completion fluid before or after running a sand control screen downhole, comprising
    injecting a wellbore fluid composition comprising a terpene composition, a viscosifier, and a surfactant, wherein the terpene composition is selected from the group consisting of cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof; the method further comprising injecting an aqueous fluid comprising a viscosifying organic polymer and wetting surfactant.

17. The method of claim 16 wherein the terpene composition comprises at least 85 percent of the wellbore fluid composition and is selected from the group of d-limonene and dipentene, and mixtures thereof; and wherein the surfactant is selected from the group consisting of sulphated polyoxyethylenated alcohol, alkyl ethoxylated alcohol, ether carboxylate surfactant, and mixtures thereof; and where in said viscosifying organic polymer is a synthetic organic polymer.

18. The method of removing oil-containing residue that impairs hydrocarbon-production in an open-hole reservoir after completion or after gravel packing with a water-based or an oil-based gravel pack carrier comprising
    injecting a wellbore fluid composition comprising a terpene composition, a viscosifier, and a surfactant, wherein the terpene composition is selected from the group consisting of cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof; the method further comprising injecting an aqueous fluid comprising a viscosifying organic polymer and wetting surfactant.

19. The method of claim 18 wherein the terpene composition comprises at least 85 percent of the wellbore fluid composition and is selected from the group of d-limonene and dipentene, and mixtures thereof; and wherein the surfactant is selected from the group consisting of sulphated polyoxyethylenated alcohol, alkyl ethoxylated alcohol, ether carboxylate surfactant, and mixtures thereof; and where in said viscosifying organic polymer is a synthetic organic polymer.

20. A method for treating a wellbore comprising
    injecting a wellbore fluid composition comprising a terpene composition, a viscosifier, and a surfactant, wherein the terpene composition is selected from the group consisting of cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof; the method further comprising injecting an aqueous fluid comprising a viscosifying organic polymer and wetting surfactant.

21. The method of claim 20 wherein the terpene composition comprises at least 85 percent of the wellbore fluid composition and is selected from the group of d-limonene and dipentene, and mixtures thereof; and wherein the surfactant is selected from the group consisting of sulphated polyoxyethylenated alcohol, alkyl ethoxylated alcohol, ether carboxylate surfactant, and mixtures thereof; and where in said viscosifying organic polymer is a synthetic organic polymer.

22. A wellbore fluid composition comprising at least 85 percent of a terpene composition which is selected from the group consisting of cyclic terpenes, and mixtures thereof; acyclic terpenes, and mixtures thereof; cyclic terpenoids having one or more benzenoid groups, and mixtures thereof; acyclic terpenoids having one or more benzenoid groups, and mixtures thereof; and mixtures thereof; a viscosifier, and a wetting surfactant that is present in a concentration of from about 0.1 to about 12 percent, and comprises a mixture of a sulphated polyoxyethylenated alcohol and an alkyl ethoxylated alcohol.

23. The wellbore fluid composition of claim 21, wherein the terpene composition is selected from the group of d-limonene and dipentene, and mixtures thereof; and wherein the surfactant is selected from the group consisting of sulphated polyoxyethylenated alcohol, alkyl ethoxylated alcohol, ether carboxylate surfactant, and mixtures thereof.

24. The wellbore fluid composition of claim 23 further comprising at least 95 percent by weight of D-limonene.

25. The composition of claim 2 further comprising water.

26. The composition of claim 22 further comprising a weighting agent.

27. A wellbore fluid composition comprising from 25% to about 90 percent of D-Limonene, about 0.1 to about 10 percent wetting surfactant comprising a mixture of a sulphated polyoxyethylenated alcohol and an alkyl ethoxylated alcohol, about 0.3 to about 3 percent viscosifier, and about 5 percent to about 70 percent of an oil or synthetic base fluid.

28. The composition of claim 27 in which wetting surfactant is present in an amount of from about 0.1 to about 5 percent.

29. The composition of claim 27 further comprising water.

30. A wellbore fluid composition comprising 93 to 96 percent D-limonene, 0.1 to 1.5 percent ether carboxylate surfactant and sulphated polyoxyethlylenated alcohol surfactant, 0.5 percent to 1.5 percent alkyl ethoxylated alcohol, about 0.3 to about 3 percent viscosifier, and water.

31. A wellbore fluid composition comprising about 25 percent to about 30 percent of D-limonene, about 1 to about 5 percent wetting surfactant comprising a mixture of a sulphated polyoxyethylenated alcohol and an alkyl ethoxylated alcohol, about 1 to about 1.5 percent viscosifier, and about 60 percent to about 70 percent of an oil or synthetic base fluid.

32. The wellbore fluid composition of claim 31 further comprising a weighting agent.

33. A wellbore fluid composition formed by blending, in any order, a terpene composition, a wetting surfactant comprising a mixture of a sulphated polyoxyethylenated alcohol and an alkyl ethoxylated alcohol, a viscosifier, and an oil or synthetic base fluid, in an amount sufficient to reduce oil-containing residue from and water wet wellbore surfaces.

34. The wellbore fluid composition of claim 33 further comprising a weighting agent.

35. The method of reducing oil-containing residue and water wet wellbore surfaces comprising contacting wellbore surfaces with the wellbore fluid composition of claim 33.

36. A composition for cleaning a section of a wellbore prior to a cementing operation, said wellbore having a casing suspended therein, comprising about 60% by volume of a terpene composition; about 0.05% by volume of an alkoxylated carboxylic acid; an alkoxylated alkyl sulfate; an alkoxylated alcohol, and water.

37. The composition of claim 36 wherein the terpene is a monocyclic terpene.

38. The composition of claim 36 wherein the terpene is d-limonene.

39. The composition of claim 36 wherein the alkoxylated carboxylic acid is an alcohol ethoxy carboxylic acid containing 1–12 ethoxy units.

40. The composition of claim 39 wherein the alkoxylated carboxylic acid is an alcohol ethoxy carboxylic acid containing 4–8 ethoxy units.

41. The composition of claim 36 wherein the alkoxylated carboxylic acid is derived from a mixture of C12 to C15 linear alcohols.

42. The composition of claim 36 wherein the alkoxylated carboxylic acid is derived from a mixture of C12 to C15 branched alcohols.

43. The composition of claim 36 wherein the alkoxylated carboxylic acid is derived from a mixture of C12 to C15 linear and branched alcohols.

44. The composition of claim 36 wherein the alkyoxylated alkyl sulfate is an alcohol mixture ethoxylated with 1–8 ethylene oxide units, all sulfated and neutralized as a salt.

45. The composition of claim 36 wherein the alkyoxylated alkyl sulfate is an alcohol mixture ethoxylated with 2–6 ethylene oxide units, all sulfated and neutralized as a salt.

46. The composition of claim 36 wherein the alkoxylated alkyl sulfate is derived from branched, linear, or a mixture of branched and linear C12 to C15 alcohols.

47. The composition of claim 36 wherein the alkoxylated alcohol is derived from branched, linear, or a mixture of branched and linear C4 to C12 alcohols ethoxylated with 1–10 ethylene oxide units.

48. The composition of claim 47 wherein the alkoxylated alcohols is derived from branched, linear, or a mixture of branched and linear C4 to C12 alcohols ethoxylated with 2–6 ethylene oxide units.

49. The composition of claim 36 wherein the alkoxylated alkyl sulfate, alkoxylated alcohol, and water are each present in amounts from about 0.1% to about 10% by volume.

50. The composition of claim 36 wherein the alkoxylated alkyl sulfate, alkoxylated alcohol, and water are each present in amounts from about 0.5% to about 5% by volume.

51. The method of claim 1 in which the wellbore fluid further comprises a mutual solvent.

52. The method of claim 12 in which the wellbore fluid further comprises a mutual solvent.

53. The method of claim 14 in which the wellbore fluid further comprises a mutual solvent.

54. The method of claim 16 in which the wellbore fluid further comprises a mutual solvent.

55. The method of claim 18 in which the wellbore fluid further comprises a mutual solvent.

56. The method of claim 20 in which the wellbore fluid further comprises a mutual solvent.

57. The wellbore fluid composition of claim 22 in which the viscosifier is selected from the group consisting of organophilic clays and aluminum phosphate esters.

58. The wellbore fluid composition of claim 22 further comprising a mutual solvent.

59. The wellbore fluid composition of claim 33 further comprising a mutual solvent.

* * * * *